Nov. 14, 1933.　　　　E. G. HALLQUIST　　　1,935,359
TRUCK STRUCTURE
Filed Sept. 4, 1931
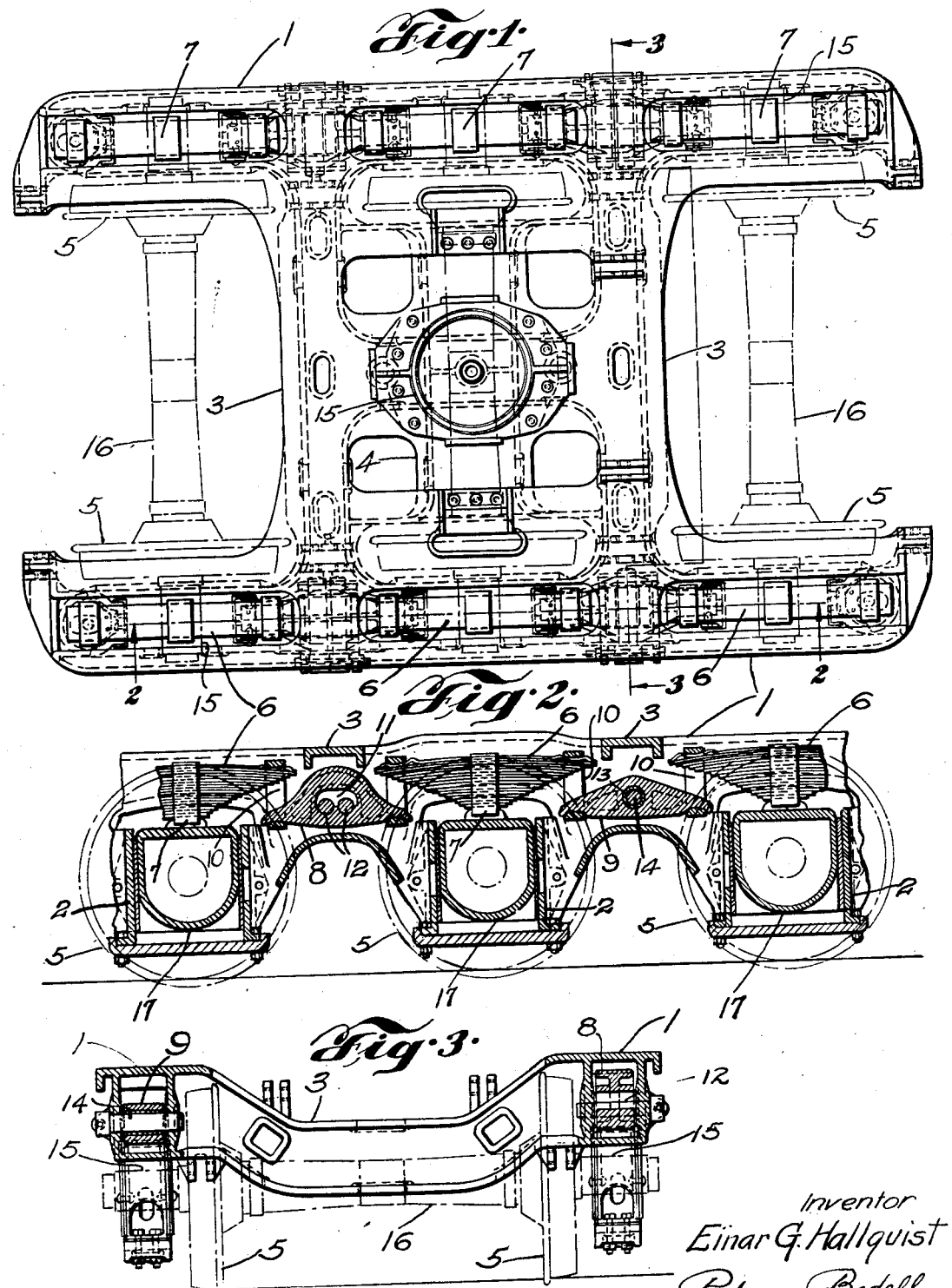
Inventor
Einar G. Hallquist
By Rodney Bedell
Attorney Patented Nov. 14, 1933

1,935,359

UNITED STATES PATENT OFFICE 1,935,359

TRUCK STRUCTURE

Einar G. Hallquist, Edwardsville, Ill., assignor to General Steel Castings Corporation, Granite City, Ill., a corporation of Delaware Application September 4, 1931. Serial No. 561,265

11 Claims. (Cl. 105—195)

This invention relates to railway rolling stock and consists particularly in a novel spring equalizer system for trucks.

In certain types of six and eight wheel trucks the frame is supported on the journals on each side of the truck through a series of interconnected springs and equalizer bars disposed longitudinally of the truck and arranged end to end. Each spring may rest on top of a corresponding journal box and have hangers at the ends thereof for supporting the equalizer bars which are in turn pivotally secured to the frame. Usually each bar has a single pivot pin which provides desirable flexibility of spring action enhancing the riding qualities but leaving the truck frame free to tilt longitudinally to a greater extent than is desirable. Spaced pivot elements have been used to increase the stability of the truck, but this results in reduced flexibility.

The present invention has for its object the provision of a truck spring equalizing system which will have greater stability than is obtained where the equalizers are each secured by a single pivot to the frame, and greater flexibility than where the equalizers are each secured to the frame by means of double pivots.

This general object and others indicated below are attained in the structure illustrated in the accompanying drawing in which—

Figure 1 is a top view of a truck embodying the invention.

Figure 2 is a vertical longitudinal section taken substantially on the line 2—2 of Figure 1.

Figure 3 is a vertical transverse section taken on the line 3—3 of Figure 1.

The invention is illustrated as applied to a six wheel tender truck comprising wheel piece 1, including pedestals 2, transoms 3, and a bolster 4 including center plate structure 15, all of said parts being supported on wheels 5 through the usual journal boxes 17 resting on journal portions 15 of axles 16.

Wheel pieces 1 are substantially of box section and house leaf springs 6 having central bands 7 resting on the journal boxes, and equalizers 8 and 9 which are supported on hangers 10 suspended from the ends of springs 6. The end hangers may be anchored to the frame or connected with adjacent springs of the truck.

Equalizer bar 8 has an elongated recess 11 having a pair of concave depressions in its lower side for seating cylindrical pivots 12 extending transversely between the vertical side walls of the wheel piece. Equalizer bar 9 has a central cylindrical opening provided with a removable bearing 13 for receiving a single pivot 14 secured to the walls of the wheel piece.

The equalizers on opposite sides of the truck may be arranged similarly to equalizers 8 and 9 so that bars having double pivotal connections with the frames will be directly opposite each other, or the arrangement may be reversed as shown so that bars having single and double pivots, respectively, will be opposite each other.

Where the invention is applied to an eight wheel truck, another spring and equalizer bar will be necessary on each side of the frame, and the added bars may be secured to the frame either by single or double pivots accordingly as greater flexibility or stability is required.

The above described equalizer arrangement provides sufficient flexibility to properly equalize the load on the respective journals resulting in smooth riding qualities of the truck, and at the same time provides the desired stability. The alternative arrangements suggested are both effective in accomplishing the desired object, although it is preferable to dispose equalizers having similar pivotal mounting diagonally across the truck, rather than directly opposite each other, to secure uniform action. Moreover, the invention is not limited to trucks, as shown, but may advantageously be used wherever an underframe member is supported upon three or more pairs of wheels through a similar spring system. If desired, the relation of the springs and equalizers with the frame and journals, respectively, may be reversed, that is, the equalizers may be mounted on the journal boxes through single and double pivotal connections and the springs may directly support the truck frame.

Obviously many of the features of the truck illustrated as well as various details of the spring system are not essential to the invention. These may be varied without departing from the spirit of the invention and exclusive use of all such variations as come within the scope of the appended claims is contemplated.

What is claimed is:

1. In combination, a railway vehicle frame, wheeled axles, and a load equalizing system for carrying said frame on said axles and including a plurality of equalizer members carried on said axles, at least one of said members supporting said frame at a single point only, and another of said members supporting said frame at a plurality of independent pivot points.

2. In combination, a railway vehicle frame, wheeled axles, and a load equalizing system for carrying said frame on said axles and comprising a plurality of members carried on said axles along the side of said frame, a pin pivotally engaging one of said members and constituting the sole support between the same and said frame, and a plurality of pins engaging another of said members, each of said last-mentioned pins being arranged to serve as a fulcrum for said member on said frame.

3. In combination, a railway vehicle frame, wheeled axles, and a load equalizing system for carrying said frame on said axles and comprising a plurality of members carried on said axles along each side of said frame, one of said members on one side of the frame having a single point of support only for said frame and the corresponding member on the opposite side of the frame having a plurality of points of support for said frame spaced longitudinally of said frame, each of said last-mentioned points being adapted to support the frame independently of the other.

4. In combination, a railway vehicle frame, wheeled axles, and a load equalizing system for carrying said frame on said axles and comprising a plurality of members carried on said axles along each side of said frame, one of said members on one side supporting said frame at a single point only and the corresponding member on the opposite side supporting said frame at a plurality of longitudinally spaced points, each of said last-mentioned points being adapted to support the frame independently of the other, there being another of said members on the first mentioned side of said frame provided with a plurality of similarly spaced points of support and there being still another of said members on the second mentioned side of said frame having a single point of support only for said frame.

5. A spring equalizing system for a railway vehicle frame and comprising a plurality of springs disposed substantially in a line, and equalizer bars intermediate and secured to adjacent springs, one of said bars having a bearing element arranged for a single pivotal connection with the supported frame and another of said bars having a bearing element arranged for a double pivotal connection with the frame.

6. In combination, a plurality of railway vehicle axles, a frame, and a spring equalizer system supporting said frame from said axles and comprising a series of spring disposed substantially in a line and supported by said axles, and equalizer bars intermediate and secured to adjacent portions of said springs, at least one of said bars having a single pivotal connection with said frame, and another of said bars having a plurality of pivotal connections with said frame, said last mentioned connections being spaced longitudinally of said frame from each other.

7. In a railway truck, a frame, a plurality of axle journals and boxes therefor spaced longitudinally along said frame, and a spring equalizer system beneath a side of the frame and including springs seated upon said boxes, and equalizer bars suspended from adjacent ends of said springs and supporting said frame, at least one of said bars having a single pivotal connection with said frame, and another of said bars having a plurality of pivotal connections with said frame, said last mentioned connections being spaced longitudinally of said frame from each other.

8. In a railway truck, a frame, journals disposed along the sides thereof, and spring equalizer systems comprising a series of leaf springs disposed longitudinally along each side of said frame and each resting on one of said journals, and equalizer bars suspended from adjacent portions of said springs and supporting said frame, at least one of said bars on each side of said frame having a single pivotal connection with said frame, and another of said bars on each side having a plurality of pivotal connections with said frame, said last mentioned connections being spaced longitudinally of said frame from each other.

9. In a railway truck, a frame, journals disposed along the sides thereof, and spring equalizer systems comprising a series of leaf springs disposed longitudinally along each side of said frame and each resting on one of said journals, and equalizer bars suspended from adjacent portions of said springs and supporting said frame, at least one of said bars having a single pivotal connection with said frame, and the corresponding bar on the opposite side having a plurality of pivotal connections with said frame, said last mentioned connections being spaced longitudinally of said frame from each other.

10. In a railway truck, a frame having substantially box section side members, journals, and spring equalizer systems disposed within said side members and comprising leaf springs, each resting on one of said journals, and equalizer bars suspended from adjacent portions of said springs and supporting said frame, at least one of said bars on each side of said frame having a single pivotal connection with said frame, and another of said bars on each side having a plurality of pivotal connections with said frame, said last mentioned connections being spaced longitudinally of said frame from each other.

11. In combination, a plurality of railway vehicle journal elements, frame elements, and a spring equalizer system supporting said frame elements from said journal elements and comprising a series of equalizer bars engaging certain of said elements, and springs intermediate and secured to adjacent portions of said bars and engaging others of said elements, at least one of said bars engaging the corresponding element only at a single pivotal point, and another of said bars engaging the corresponding element at a plurality of longitudinally spaced pivot points.

EINAR G. HALLQUIST.